US012759247B2

(12) United States Patent
Ataka et al.

(10) Patent No.: US 12,759,247 B2
(45) Date of Patent: Oct. 13, 2026

(54) FIBER BUNDLE CUTTING METHOD IN AUTOMATED FIBER BUNDLE PLACEMENT APPARATUS AND AUTOMATED FIBER BUNDLE PLACEMENT APPARATUS

(71) Applicant: TSUDAKOMA KOGYO KABUSHIKI KAISHA, Ishikawa-ken (JP)

(72) Inventors: Takeshi Ataka, Ishikawa-ken (JP); Ren Uenaka, Ishikawa-ken (JP); Takahisa Fujinaga, Ishikawa-ken (JP)

(73) Assignee: TSUDAKOMA KOGYO KABUSHIKI KAISHA, Ishikawa-ken (JP)

( * ) Notice: Subject to any disclaimer, the term of this patent is extended or adjusted under 35 U.S.C. 154(b) by 0 days.

(21) Appl. No.: 17/677,607

(22) Filed: Feb. 22, 2022

(65) Prior Publication Data

US 2022/0305741 A1 Sep. 29, 2022

(30) Foreign Application Priority Data

Mar. 23, 2021 (JP) ................................ 2021-048603

(51) Int. Cl.
*B29C 70/38* (2006.01)
*B29C 70/54* (2006.01)
*B29C 37/00* (2006.01)

(52) U.S. Cl.
CPC .......... *B29C 70/384* (2013.01); *B29C 70/545* (2013.01); *B29C 2037/903* (2013.01); *B29C 2793/0027* (2013.01)

(58) Field of Classification Search
CPC ................ B29C 70/384; B29C 70/545; B29C 2037/903; B29C 2793/0027; B29C 70/38; B32B 37/00
See application file for complete search history.

(56) References Cited

U.S. PATENT DOCUMENTS 5,873,291 A 2/1999 Sand
2009/0199948 A1 * 8/2009 Kisch .................... B29C 70/382 156/64

(Continued)

FOREIGN PATENT DOCUMENTS

EP 0771315 A1 5/1997
EP 3045297 A1 7/2016

(Continued)

OTHER PUBLICATIONS

Aug. 9, 2022, European Search Report issued for related EP Application No. 22158516.9.

*Primary Examiner* — Alison L Hindenlang
*Assistant Examiner* — Shibin Liang
(74) *Attorney, Agent, or Firm* — Paratus Law Group, PLLC

(57) ABSTRACT

A fiber bundle cutting method in an automated fiber bundle placement apparatus includes: obtaining a placement length of a fiber bundle in an operating time of a movable blade from a start time point of a drive period to an end time point of a contact period, based on an operating time and a basic speed; setting, as a first time point, a time point determined as preceding the start time point by a predetermined preceding period; obtaining an additional speed to extra deliver at least a placement length during the preceding period; changing a feeding speed from an actual feeding speed to a corrected feeding speed obtained by adding the additional speed to the actual feeding speed at the first time point; and stopping rotary drive of a roller by a drive motor at the start time point.

2 Claims, 4 Drawing Sheets

(56) References Cited

U.S. PATENT DOCUMENTS

| | | | | |
|---|---|---|---|---|
| 2009/0229760 | A1* | 9/2009 | Hamlyn ................ | B29C 70/384<br>156/433 |
| 2015/0013892 | A1 | 1/2015 | Horst et al. | |
| 2021/0129456 | A1 | 5/2021 | Inagaki et al. | |
| 2022/0134684 | A1 | 5/2022 | Suzuki et al. | |

FOREIGN PATENT DOCUMENTS

| | | | |
|---|---|---|---|
| EP | 3613581 | A1 | 2/2020 |
| JP | 2015-016691 | A | 1/2015 |
| JP | 2019-130914 | A | 8/2019 |
| WO | WO 96/02475 | A1 | 2/1996 |
| WO | WO 2020/170709 | A1 | 8/2020 |

* cited by examiner

FIBER BUNDLE CUTTING METHOD IN AUTOMATED FIBER BUNDLE PLACEMENT APPARATUS AND AUTOMATED FIBER BUNDLE PLACEMENT APPARATUS

CROSS-REFERENCE TO RELATED APPLICATION(S)

This application is based on and claims priority under 35 USC 119 from Japanese Patent Application No. 2021-048603 filed on Mar. 23, 2021, the contents of which are incorporated herein by reference.

TECHNICAL FIELD

The present invention relates to an automated fiber bundle placement apparatus including a placing head configured to perform placement of a plurality of fiber bundles supplied from a supply device onto a placement die by pressing the fiber bundles onto the placement die by a pressing part, the placing head including a delivery mechanism having a pair of rollers provided for each of paths of the fiber bundles so as to deliver the fiber bundle toward the pressing part, and a drive motor configured to rotationally drive at least one of the pair of rollers; an articulated robot configured to move the placing head at a preset basic speed for the placement, and a drive control device configured to control drive of the drive motor so that a feeding speed of the fiber bundle becomes an actual feeding speed corresponding to the basic speed, particularly wherein the placing head has a cutting device provided between the pressing part and the delivery mechanism in a feeding direction of the fiber bundle and configured to perform cutting of the fiber bundle by driving a movable blade, and the cutting device is configured such that the cutting is performed during a contact period for which the movable blade and the fiber bundle come into contact with each other during a drive period for which the movable blade is driven and such that drive of the movable blade is performed in such an aspect that an amount of displacement of the movable blade in the feeding direction during the contact period becomes smaller than a feeding amount of the fiber bundle.

BACKGROUND ART

As an automated fiber bundle placement apparatus, known is an AFP (Automated Fiber Placement) apparatus configured to place a thin fiber bundle onto a placement die. Note that, as used herein, the “fiber bundle” refers to a material such as a so-called tow prepreg formed into a tape shape by impregnating a matrix resin in a bundle of a plurality of reinforced fibers (carbon fibers, glass fibers and the like). In addition, as the AFP apparatus, there is an apparatus configured to perform placement of a fiber bundle onto a placement die by using an articulated robot.

PTL 1 discloses, as the AFP apparatus, an apparatus including an unwinding mechanism as a supply device, a sticking head as a placing head for performing the placement by pressing the fiber bundle supplied from the unwinding mechanism by a pressing part (pressing member) such as a roller, and an articulated robot configured to move the sticking head for the placement. In addition, in the AFP apparatus of PTL 1, the sticking head has a feeder as a delivery mechanism configured to deliver the fiber bundle toward the pressing member. The delivery mechanism (feeder) is configured to include two sets of roller pairs provided on a path of the corresponding fiber bundle and a pair of conveying belts configured to drive by rotationally driving the roller pairs, and is provided to nip the fiber bundle by the pair of conveying belts.

Note that, the delivery mechanism is a mechanism configured to deliver the fiber bundle toward the pressing member, as described above, and is configured to positively deliver the fiber bundle. Therefore, although not disclosed in PTL 1, the delivery mechanism has a drive source such as a drive motor. The delivery of the fiber bundle by the delivery mechanism is usually performed so that the fiber bundle is delivered at a speed corresponding to a moving speed of the sticking head. In other words, drive of the drive motor in the delivery mechanism is controlled so that the feeding speed of the fiber bundle becomes a speed corresponding to the moving speed of the sticking head during the placement. Further, although the specific configuration is not described in PTL 1, it is described that it is usual to provide a fiber bundle cutting means for cutting the fiber bundle in the sticking head so that the fiber bundle of a predetermined length is placed on the placement die.

In addition. PTL 2 discloses, as the AFP apparatus, an apparatus configured to place a plurality of tows (fiber bundles) onto a base material (placement die) by using an NC machine (robot arm) as an articulated robot and a supply head as a placing head. PTL 2 discloses a part (cutting device) of the supply head configured to function as the cutting device for cutting the fiber bundle as described above.

The cutting device is more specifically described. The cutting device includes cutter rocker arms each provided for each fiber bundle, provided on a further upstream side than a compression roller as a pressing part with respect to a feeding direction of the fiber bundle, supported by a cutter rocker shaft and provided so as to be rotatable (swingable) around the shaft, and cutter blades as movable blades each attached to each cutter rocker arm. In addition, the supply head is provided with pistons each provided for each cutter rocker arm. The cutting device is configured such that the cutter rocker arm is rotated by an advancing/retreating operation of the piston, and the cutter blade is accordingly advanced/retreated in a thickness direction of the fiber bundle to cut the fiber bundle in a direction orthogonal to the feeding direction of the fiber bundle.

CITATION LIST

Patent Literature

PTL 1: JP2019-130914A

PTL 2: JP2015-016691 A

In the cutting device disclosed in PTL 2 described above, the movable blade is driven by the piston, and the fiber bundle is cut during a contact period for which the movable blade and the fiber bundle actually come into contact with each other during a drive period of the movable blade. In addition, the movable blade is driven in such an aspect that the movable blade is advanced and retreated with respect to the fiber bundle at substantially the same position with respect to the feeding direction of the fiber bundle. That is, the movable blade is driven in such an aspect that an amount of displacement of the movable blade in the feeding direction during the contact period becomes smaller than the feeding amount of the fiber bundle.

Note that, in the AFP apparatus that employs the cutting device configured to drive the movable blade in the above-described aspect, when it is intended to perform cutting by the cutting device while continuing to deliver the fiber bundle by the delivery mechanism during the placement, the fiber bundle being conveyed is blocked by the movable blade, so that so-called jamming of the fiber bundle occurs. Therefore, in the AFP apparatus, it is necessary to stop the delivery (displacement) of the fiber bundle at the time of cutting the fiber bundle (during the drive period), and accordingly, it is also necessary to stop the movement of the placing head by the articulated robot.

However, when the movement of the placing head is stopped and the fiber bundle is cut in this way, the movement is stopped during the placement and the placement is also interrupted over the drive period for each placement. For this reason, it takes more time, as compared to a case where the single placement is continuously performed without the above-described stop, which causes problems that the efficiency of the placement is lowered and the productivity is thus lowered.

SUMMARY

In view of the above situations, an object of the present invention is to provide a fiber bundle cutting method and a device in an automated fiber bundle placement apparatus capable of cutting a fiber bundle without stopping movement of a placing head, so as to prevent occurrence of the above-described problems in an automated fiber bundle placement apparatus including a cutting device configured to cut a fiber bundle during the placement.

The preamble of the present invention is an automated fiber bundle placement apparatus including a placing head configured to perform placement of a plurality of fiber bundles supplied from a supply device onto a placement die by pressing the fiber bundles onto the placement die by a pressing part, the placing head including a delivery mechanism having a pair of rollers provided for each of paths of the fiber bundles so as to deliver the fiber bundle toward the pressing part and a drive motor configured to rotationally drive at least one of the pair of rollers; an articulated robot configured to move the placing head at a preset basic speed for the placement; and a drive control device configured to control drive of the drive motor so that a feeding speed of the fiber bundle becomes an actual feeding speed corresponding to the basic speed, particularly wherein the placing head has a cutting device provided between the pressing part and the delivery mechanism in a feeding direction of the fiber bundle and configured to perform cutting of the fiber bundle by driving a movable blade, and the cutting device is configured such that the cutting is performed during a contact period for which the movable blade and the fiber bundle come into contact with each other during a drive period for which the movable blade is driven, and is configured such that drive of the movable blade is performed in such an aspect that an amount of displacement of the movable blade in the feeding direction during the contact period becomes smaller than a feeding amount of the fiber bundle.

In addition, a fiber bundle cutting method of the present invention is characterized by obtaining, in the automated fiber bundle placement apparatus of the above-described preamble, a placement length of the fiber bundle in an operating time of the movable blade from a start time point of the drive period to an end time point of the contact period, based on the operating time and the basic speed; setting, as a first time point, a time point determined as preceding the start time point by a predetermined preceding period; and obtaining an additional speed to extra deliver at least the placement length during the preceding period. The cutting method is characterized by changing a feeding speed from the actual feeding speed to a corrected feeding speed obtained by adding the additional speed to the actual feeding speed at the first time point, and stopping rotary drive of the roller by the drive motor at the start time point.

Further, the automated fiber bundle placement apparatus of the present invention includes a storage unit in which a first time point determined as preceding a start time point of the drive period by a predetermined preceding period, and an additional speed to deliver, during the preceding period, the fiber bundle of a placement length or longer of a fiber bundle in an operating time are stored, the placement length of the fiber bundle being obtained based on the operating time of the movable blade from the start time point to an end time point of the contact period and the basic speed. In addition, the automated fiber bundle placement apparatus is characterized in that the drive control device is configured to change the feeding speed from the actual feeding speed to a corrected feeding speed obtained by adding the additional speed to the actual feeding speed at the first time point, and to stop rotary drive of the roller by the drive motor at the start time point.

In addition, in the cutting method of the present invention, an arithmetic equation for obtaining the additional speed with the basic speed as a parameter may be set in advance, with a change of the basic speed, the additional speed corresponding to the changed basic speed may be obtained using the arithmetic equation, and the corrected feeding speed may be changed based on the obtained additional speed. In addition, in the automated fiber bundle placement apparatus of the present invention, the arithmetic equation may be set in advance in the storage unit, and the automated fiber bundle placement apparatus may include a computing unit configured to obtain the additional speed corresponding to the basic speed by using the arithmetic equation and to obtain the corrected feeding speed based on the obtained additional speed.

According to the present invention, in the placement process of the fiber bundles by the automated fiber bundle placement apparatus, at a time point reaching the first time point set as preceding the start time point, at which the drive of the movable blade is started, by the preceding period, the feeding speed of the fiber bundle by the delivery mechanism is changed from the actual feeding speed corresponding to the basic speed to the corrected feeding speed. However, the corrected feeding speed is such a speed obtained by adding the additional speed to the actual feeding speed that a fiber bundle corresponding to a placement length placed in the operating time of the movable blade (a time from the start time point to the end time point of the contact period) is delivered extra during the preceding period. Thereby, a length of the fiber bundle that is delivered during the preceding period (from the first time point to the start time point) is one obtained by adding the same length (extra length) as the placement length of the fiber bundle placed in the operating time to the length that is delivered at the actual feeding speed during the preceding period.

In addition, the delivery of the fiber bundle by the delivery mechanism is stopped at the time point reaching the start time point. That is, the operation of cutting the fiber bundle by the cutting device is performed in a state where the delivery of the fiber bundle is stopped. Thereby, even when the cutting device is configured so that the drive of the movable blade is performed in such an aspect that the amount of displacement of the movable blade in the feeding direction during the contact period becomes smaller than the feeding amount of the fiber bundle, the fiber bundle can be cut without causing jamming of the fiber bundle.

Note that, the delivery of the fiber bundle during a period from the first time point to the start time point (a time point at which the delivery mechanism is stopped) is performed at the corrected feeding speed, as described above, so that a length of the fiber bundle placed during the period (a length consumed as a result of the placement) is the same as the length delivered at the actual feeding speed during the same period. Therefore, at the start time point at which the delivery mechanism is stopped, the fiber bundle on a further downstream side than the delivery mechanism has a slack corresponding to the extra length. Thereby, even when the delivery of the fiber bundle by the delivery mechanism is stopped, the supply of the fiber bundle toward the pressing part is continued by an amount of the slack. Therefore, even though the placement (movement of the placing head) is not stopped, the placement is performed while gradually eliminating the slack.

In addition, the additional speed in the corrected feeding speed is obtained based on the length of the fiber bundle that is placed in the operating time from the start time point (a time point at which the delivery is stopped) to the end time point of the contact period, as described above. Thereby, the fiber bundle is in a state where the slack is almost eliminated at the end time point of the contact period, and is placed by a predetermined length.

As such, according to the present invention, in the automated fiber bundle placement apparatus that employs the cutting device configured so that the drive of the movable blade is performed in the above-described aspect, the delivery of the fiber bundle is stopped at the time when the cutting operation by the cutting device is performed. Therefore, the jamming of the fiber bundle due to the cutting by the configuration of the cutting device does not occur. Further, according to the present invention, even when the delivery of the fiber bundle is stopped in the middle of the placement, as described above, the delivery of the fiber bundle is performed so that the above-described slack remains on the further downstream side than the delivery mechanism at the time point (the start time point) at which the delivery is stopped. As a result, the supply of the fiber bundle toward the pressing part by the slackened fiber bundle is continued, so that the placement can be continued without stopping the same. Thereby, the placement can be performed without causing deterioration in the efficiency of the placement as described above.

Further, in the automated fiber bundle placement apparatus according to the present invention, the arithmetic equation for obtaining the additional speed with the basic speed as a parameter is set in advance, and the additional speed that is used so as to obtain the corrected feeding speed, as the basic speed changes, is obtained using the arithmetic equation, so that it is possible to facilitate a setting operation by an operator.

Specifically, the basic speed of the placing head is not limited as being always constant, and is set so that the placement is performed at a different speed, depending on placement conditions such as a shape of the placement die. In addition, the additional speed for obtaining the corrected feeding speed is the speed set so as to extra deliver, during the preceding period, the placement length that is placed in the operating time of the movable blade, as described above, and is therefore different for each basic speed. Therefore, for example, in a case where the placement onto one placement die is performed with different basic speeds depending on placement locations or the like, the corrected feeding speed is obtained by using a different additional speed for each placement. In this case, a method is considered in which the operator obtains an additional speed based on each basic speed and the like, which are perceived in advance, and sets each additional speed in a form of associating the same with the basic speed. However, in this case, the operations associated with the setting become troublesome.

In contrast, by making it possible to obtain the additional speed for obtaining the corrected feeding speed by using the arithmetic equation set as described above, the additional speed is automatically obtained using the arithmetic equation. Therefore, it is possible to omit the operations associated with the setting of the additional speed as described above. This can facilitate the setting operation necessary for the placement.

DESCRIPTION OF EMBODIMENTS

Hereinafter, one embodiment of an automated fiber bundle placement apparatus of the present invention will be described with reference to FIGS. 1 to 4.

Figure 1:
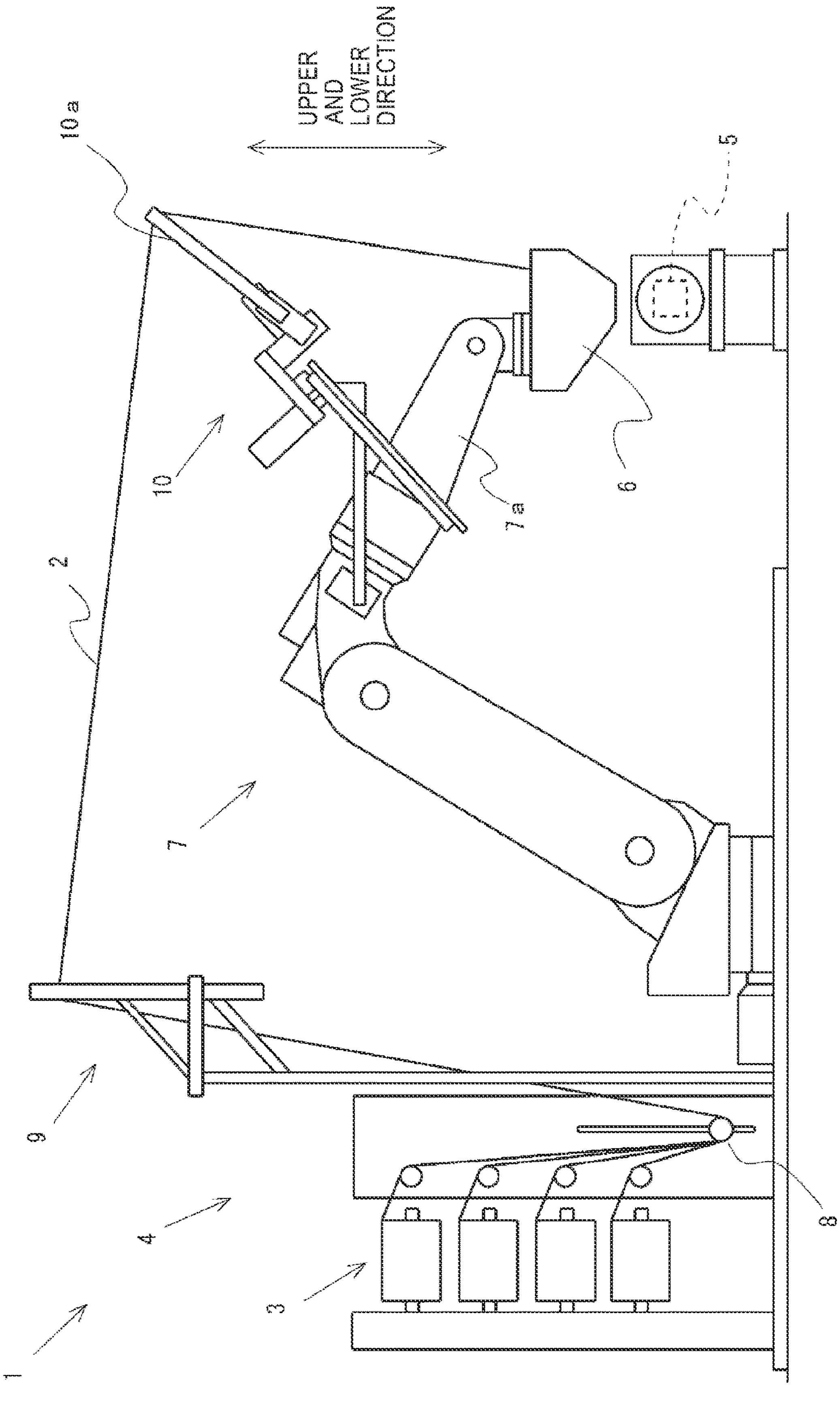
FIG. 1 is a side view showing one embodiment of an automated fiber bundle placement apparatus to which the present invention is applied.

As shown in FIG. 1, an automated fiber bundle placement apparatus 1 includes a supply device 4 to which bobbins 3 each having a fiber bundle 2 wound thereon are mounted, a placing head 6 configured to perform placement of the fiber bundles 2 supplied from the supply device 4 onto a placement die 5, and an articulated robot 7 configured to move the placing head 6 for the placement. Note that, in the present embodiment, the automated fiber bundle placement apparatus 1 is configured to perform the placement of the sixteen fiber bundles 2 at the same time. Therefore, although only the four bobbins on a front side are shown in FIG. 1, the sixteen bobbins 3 are mounted to the supply device 4.

The supply device 4 also includes a guide unit 9 configured to guide the fiber bundle 2 unwound from each bobbin 3 toward the articulated robot 7. The guide unit 9 has a guide member (not shown) provided for each fiber bundle 2 so as to individually guide each fiber bundle 2, and is configured to guide each fiber bundle 2 at a position higher than the articulated robot 7 by the guide member. The supply device 4 is also provided with a dancer roller 8 common to each of the fiber bundles 2, as a configuration for adjusting tension of each fiber bundle 2, in a path of the fiber bundle 2 between each bobbin 3 and the guide unit 9. By the configuration, each fiber bundle 2 is adjusted to have appropriate tension between the bobbin 3 and the guide unit 9, and is pulled toward the articulated robot 7 in an appropriate tension state.

In addition, a guide mechanism 10 for guiding each fiber bundle 2 guided by the guide unit 9 as described above is attached to the articulated robot 7. The guide mechanism 10 is attached to an arm **7*a* on a tip end-side of the articulated robot 7. In addition, the guide mechanism 10 has a tow guide (not shown) provided for each fiber bundle 2 so as to individually guide each fiber bundle 2, and each tow guide is configured to be supported by a support member 10*a*. The guide mechanism 10 is provided such that the support member 10***a* extends upward above the arm 7*a* and each fiber bundle 2 is guided on a tip end-side of the support member 10*a*.

Therefore, in the automated fiber bundle placement apparatus 1, the fiber bundle 2 pulled out from each bobbin 3 is pulled out from the supply device 4 (guide unit 9) at a position higher than the articulated robot 7 in a vertical direction, passes above the articulated robot 7 and reaches the guide mechanism 10. Each fiber bundle 2 is turned in a form of being guided to the guide mechanism 10, and is guided to the placing head 6 attached to a tip end of the arm 7*a* of the articulated robot 7.

Figure 2:
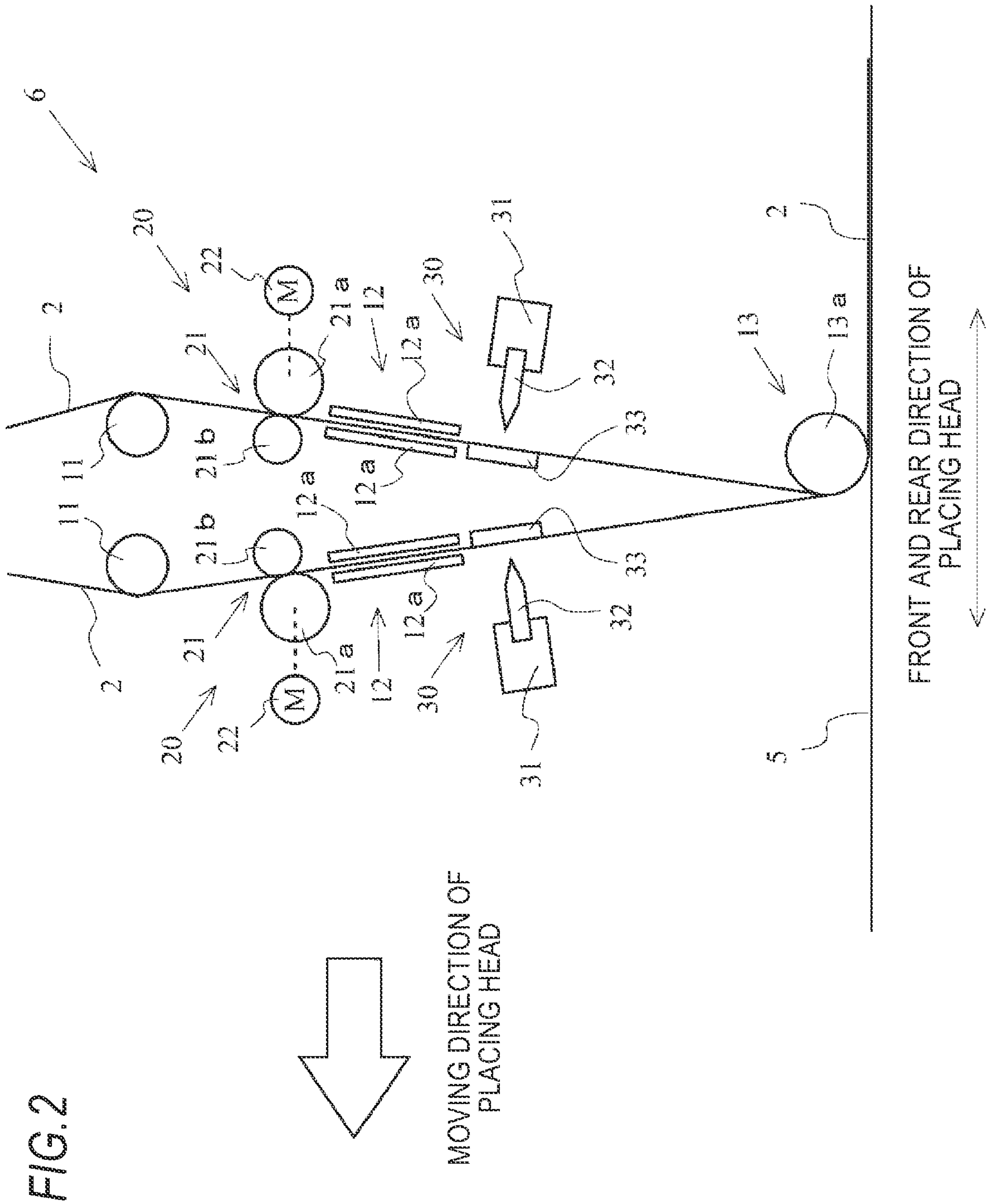
FIG. 2 illustrates a placing head of the automated fiber bundle placement apparatus.

As shown in FIG. 2, the placing head 6 has a pressing device 13 configured to press the fiber bundle 2 onto the placement die 5, a delivery mechanism 20 configured to deliver the fiber bundle 2 toward the pressing device 13, and a cutting device 30 configured to cut the fiber bundle 2 between the pressing device 13 and the delivery mechanism 20. Note that, the placing head 6 has a guide roller 11 provided above the delivery mechanism 20 and configured to guide the fiber bundle 2 toward the delivery mechanism 20. In addition, a regulation guide 12 configured to regulate displacement of the fiber bundle 2 in a thickness direction thereof is provided between the delivery mechanism 20 and the cutting device 30.

As for the respective constitutional members, the pressing device 13 has a pressing part 13*a* configured to press the fiber bundle 2 onto the placement die 5 and a pressing mechanism (not shown) configured to generate a pressing force toward the placement die 5 for the pressing part 13*a*. Note that, in the present embodiment, the pressing part 13*a* is a so-called compaction roller that is a roller-shaped member provided to be rotatable, as a member common to each fiber bundle 2.

The guide roller 11 is provided in such a form that an axis line direction thereof coincides with an axis line direction of the pressing part (compaction roller) 13*a*. In addition, as described above, in the present embodiment, in order to allot the sixteen fiber bundles 2 guided to the placing head 6 into two groups, the guide roller 11 is provided in two in different positions in a front and rear direction of the placing head 6 (a direction matching a direction in which the fiber bundle 2 is placed onto the placement die 5 in association with the placement). Each fiber bundle 2 is allotted to any one guide roller 11 and guided, so that, in the placing head 6, the sixteen fiber bundles 2 are allotted to two groups, are guided by the guide rollers 11 in the positions different for each group in the front and rear direction and reach the pressing part 13*a*.

Note that, each group of the fiber bundles 2 is composed of the eight fiber bundles 2 because the sixteen guide rollers 11 are equally allotted. Therefore, the paths by the sixteen fiber bundles 2 become eight paths in each of the two positions different in the front and rear direction, respectively. The path of each fiber bundle 2 in the placing head 6 passes through the guide roller 11 corresponding to the fiber bundle 2 and reaches the pressing part 13*a* common to each fiber bundle 2.

The delivery mechanism 20 also includes a conveying mechanism 21 provided for each path of the fiber bundle 2 and a drive motor 22 provided for each conveying mechanism 21 and configured to rotationally drive the conveying mechanism 21. In the present embodiment, each conveying mechanism 21 is constituted by a pair of rollers 21*a* and 21*b* provided to nip the fiber bundle 2. Each conveying mechanism 21 is configured such that as one (the roller 21*a*, in the shown example) of the pair of rollers 21*a* and 21*b* is rotationally driven by the drive motor 22, the other is accordingly driven, thereby conveying the fiber bundle 2 toward the pressing part 13*a* of the pressing device 13.

Further, as described above, the regulation guide 12 is provided so as to regulate the displacement of the fiber bundle 2 in the thickness direction of the fiber bundle 2 between each delivery mechanism 20 and each cutting device 30. Therefore, the regulation guide 12 is constituted by a pair of regulation members 12*a* and 12*a* provided facing each other so as to sandwich the fiber bundle 2 in the thickness direction. Note that, in the present embodiment, the fiber bundles 2 are guided with being divided into two groups of eight as described above. However, each regulation member 12*a* is formed as a member having a size that includes an existence range of the eight fiber bundles 2 with respect to a width direction of the fiber bundle 2. Therefore, each regulation member 12*a* is provided as a single one common to the eight fiber bundles 2 in the group, and the regulation guide 12 is provided in one for each group.

Note that, the regulation guide 12 is configured to regulate the displacement of the fiber bundle 2 in the thickness direction, as described above. Therefore, an interval between the pair of regulation members 12*a* and 12*a* is set as an interval slightly greater than a thickness dimension of the fiber bundle 2. Further, each regulation member 12*a* is formed so that a size thereof in the feeding direction of the fiber bundle 2 in a state of being arranged as described above is a size including most of the fiber bundle 2 ranging from the delivery mechanism 20 to the cutting device 30.

The cutting device 30 also includes a movable blade 32 provided for each path of the fiber bundle 2 and a receiving member 33 provided so as to sandwich the path between the receiving member and the movable blade 32. The cutting device 30 also includes a movable blade driving mechanism 31 provided for each movable blade 32 and configured to cause the movable blade 32 to perform a cutting operation for cutting the fiber bundle 2.

Note that, each movable blade 32 is provided in such a form that an extension direction of a blade line (blade edge) thereof is parallel to the width direction and substantially orthogonal to the feeding direction. In addition, the receiving member 33 is provided so as to sandwich the fiber bundle 2 between the receiving member and the movable blade 32, as described above, and is provided for each fiber bundle 2 in arrangement of substantially abutting against the fiber bundle 2 in the thickness direction. For reference, each receiving member 33 is a flat plate-shaped member in the present embodiment, and is a member whose dimension in the width direction in the state of being arranged as described above is slightly greater than the width dimension of the fiber bundle 2.

In addition, in the present embodiment, the movable blade driving mechanism 31 is configured to linearly displace the movable blade 32 provided as described above in the thickness direction. The movable blade driving mechanism 31 is configured to reciprocally displace the movable blade 32 in a linear form as described above between a standby position where the movable blade 32 is most distant and retreated from the fiber bundle 2 and a cutting position where the movable blade 32 comes into contact with the receiving member 33 to cut the fiber bundle 2. Note that, since the configuration itself of the movable blade driving mechanism 31 is well known, detailed description and illustration thereof are omitted. However, for example, a solenoid valve is used as a drive source, and the solenoid valve is switched between energized and de-energized, thereby displacing the movable blade 32, as described above.

In the cutting device 30 configured as described above, as for each movable blade 32, the movable blade 32 at the standby position is moved forward toward the fiber bundle 2 by the movable blade driving mechanism 31, and the movable blade 32 is displaced to the cutting position where the blade edge comes into contact with the receiving member 33, so that the fiber bundle 2 is cut in cooperation with the movable blade 32 and the receiving member 33. After the cutting, the movable blade 32 at the cutting position is moved backward away from the receiving member 33 by the movable blade driving mechanism 31, and the movable blade 32 is displaced to the standby position, so that the cutting operation by the cutting device 30 is completed.

Figure 3:
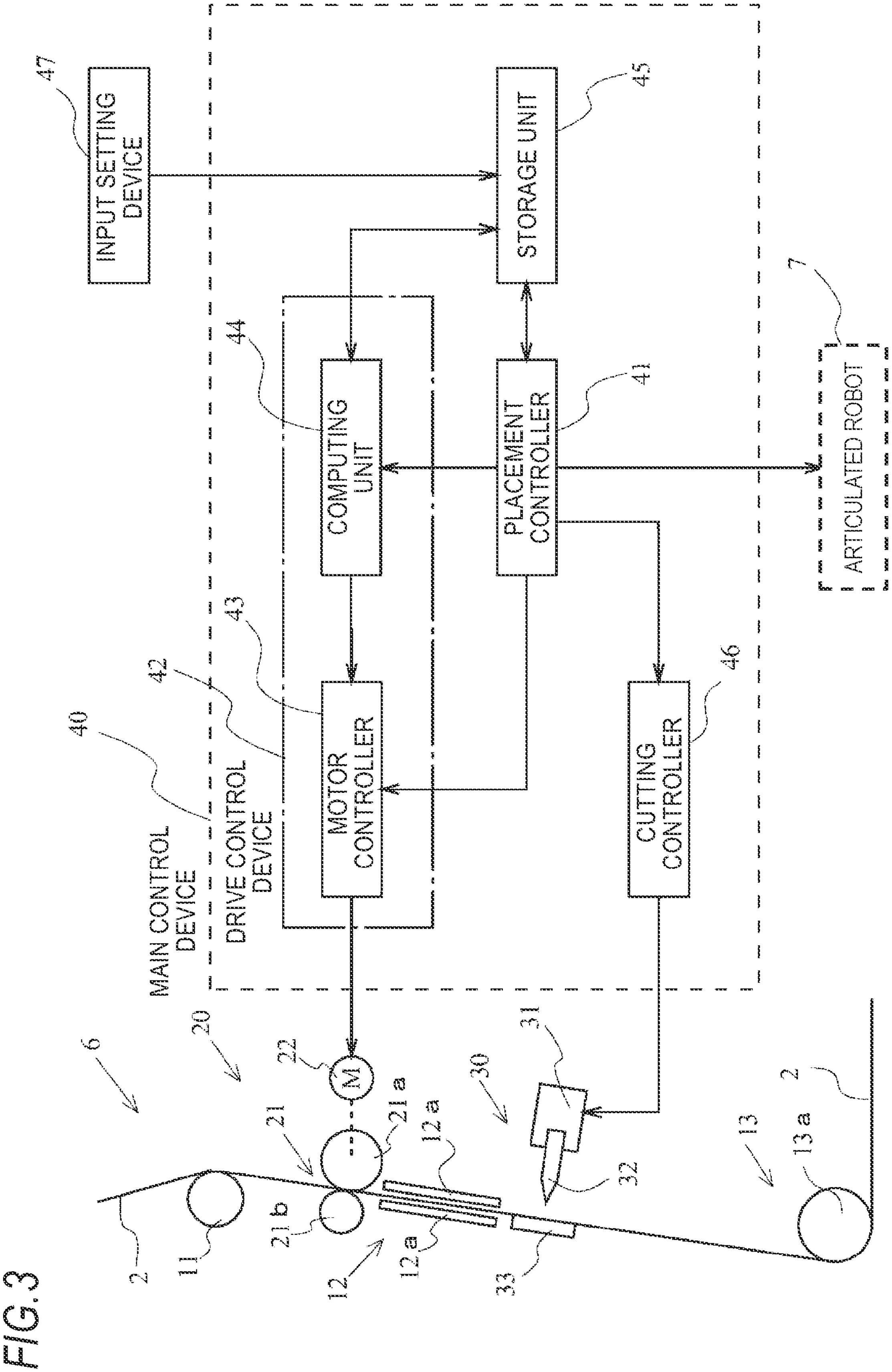
FIG. 3 is a block diagram showing a control configuration of the automated fiber bundle placement apparatus.
Figure 4:
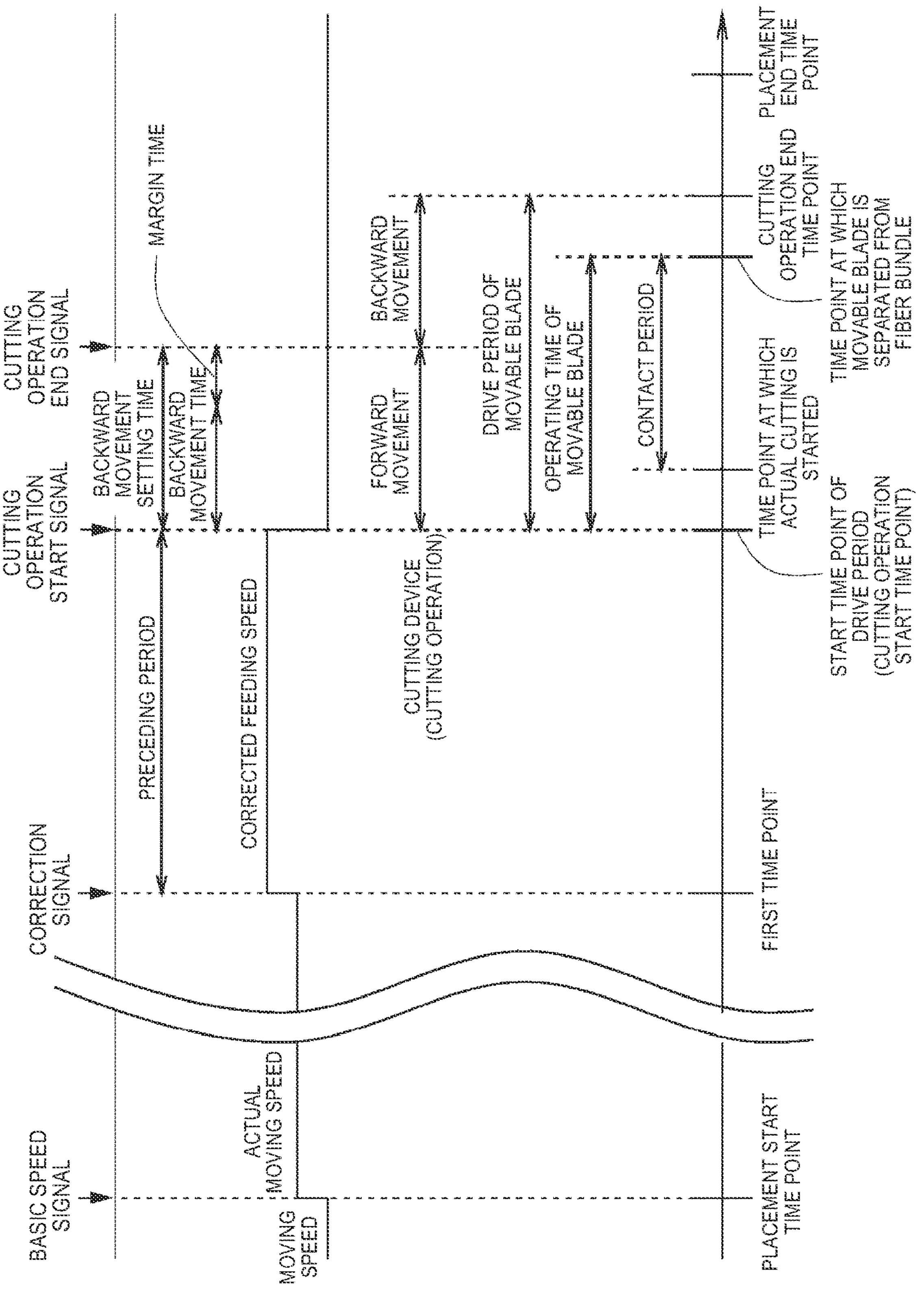
FIG. 4 is a timing chart showing an example of a control aspect of the automated fiber bundle placement apparatus.

The automatic fiber bundle placement apparatus 1 also has a main control device 40 as shown in FIG. 3, as a constitutional element for controlling the operation of the articulated robot 7 for executing the placement and the operation of each part of the placing head 6. The main control device 40 is more specifically described. The operation of the articulated robot 7 and the operation of each part of the placing head 6 are controlled according to a preset operation program. Therefore, the main control device 40 includes a storage unit 45 that stores control information for each control of the operation program and the like. The automatic fiber bundle placement apparatus 1 also has an input setting device 47 for an operator to input and set a setting value necessary for each control. The input setting device 47 is connected to the storage unit 45.

The main control device 40 also includes a placement controller 41 configured to control the articulated robot 7 configured to move the placing head 6. The placement controller 41 is connected to the above-described storage unit 45, and is also connected to each drive part (not shown) of the articulated robot 7 so as to cause the articulated robot 7 to execute an operation according to the operation program stored in the storage unit 45. Note that, the operation program includes a basic speed relating to a moving speed of the placing head 6 at the time of executing the placement and set according to placement conditions such as a shape of the placement die 5. In addition, the placement controller 41 is configured to control drive of the articulated robot 7 according to the operation program stored in the storage unit 45 at the time of executing the placement. By controlling the drive of the articulated robot 7 in this way, the placing head 6 is moved at the basic speed corresponding to the placement at that time.

Further, as described above, the main control device 40 is configured to control an operation of each part of the placing head 6 for executing the placement, specifically, an operation of the delivery mechanism 20 configured to deliver the fiber bundle 2 toward the pressing device 13 and an operation of the cutting device 30 configured to cut the fiber bundle 2. Therefore, the main control device 40 includes a drive control device 42, as a constitutional element for controlling drive of each drive motor 22 provided corresponding to each conveying mechanism 21 of the delivery mechanism 20. The main control device 40 also includes a cutting controller 46, as a constitutional element for controlling drive of each movable blade driving mechanism 31 provided corresponding to each movable blade 32 of the cutting device 30.

Among the constitutional elements, the drive control device 42 includes a computing unit 44 configured to output a drive command signal corresponding to the feeding speed of the fiber bundle 2 by each conveying mechanism 21, and a motor controller 43 configured to control drive of each drive motor 22 based on the drive command signal output from the computing unit 44. In the drive control device 42, the computing unit 44 is connected at its input end to the placement controller 41 and the storage unit 45. In addition, the motor controller 43 is connected at its input end to the computing unit 44 and the drive motor 22.

Further, as for the computing unit 44, the computing unit 44 is configured to obtain a drive speed of each drive motor 22 configured to rotationally drive the conveying mechanism 21 so that the fiber bundle 2 is delivered by each conveying mechanism 21 at an actual feeding speed that is a feeding speed corresponding to the above-described basic speed of the placing head 6. Note that, the actual feeding speed is basically the same as the basic speed that is the moving speed of the placing head 6.

More specifically, as described above, the placement controller 41 is configured to control the drive of the articulated robot 7 accompanied by movement of the placing head 6 according to the operation program including the basic speed corresponding to each of the placements, but is configured, for each of the placements, a signal (basic speed signal) indicative of the basic speed included in the operation program to the computing unit 44. The computing unit 44 is configured, as the basic speed signal is input thereto, to obtain a drive speed of the drive motor 22 at which the feeding speed of the fiber bundle 2 by each conveying mechanism 21 becomes the same speed as the basic speed, based on the basic speed that is a speed indicated by the basic speed signal. In this case, the feeding speed that is the same as the basic speed is the actual feeding speed referred to in the present invention.

Further, in the present embodiment, the drive control device 42 is configured so that tension control for correcting the drive speed of the drive motor 22 based on tension of the fiber bundle 2 is executed. Therefore, the placing head 6 is provided with a tension detector (not shown) configured to detect the tension of the fiber bundle for each fiber bundle 2, and is configured so that a tension detection signal output from the tension detector is input to the computing unit 44 of the drive control device 42. In addition, it is assumed that a target tension value of the fiber bundle 2 is stored in the storage unit 45. Further, the computing unit 44 is configured to compare a detected tension value by the tension detection signal and the target tension value stored in the storage unit 45 during the placement, for example, in a predetermined cycle, and to correct the drive speed obtained based on the basic speed as described above in a manner of eliminating a deviation when the deviation occurs between the two values. When the deviation occurs and the drive speed is corrected in this way, the feeding speed by the conveying mechanism 21 at the time when the drive motor 22 is driven at the corrected drive speed becomes the actual feeding speed.

The computing unit 44 is configured to output a drive command signal corresponding to the drive speed to the motor controller 43, as the drive speed of the drive motor 22 is obtained (corrected) in this way. In addition, the motor controller 43 is configured to control the drive of the drive motor 22 so that the drive motor 22 is driven at the drive speed indicated by the drive command signal as the drive command signal is input thereto.

Further, as for the cutting controller 46 configured to control drive of each movable blade driving mechanism 31 described above, the cutting controller 46 is connected at its output end to each movable blade driving mechanism 31 and is also connected at its input end to the placement controller 41. The cutting controller 46 is configured to control the drive of each movable blade driving mechanism 31 so that the movable blade 32 of the cutting device 30 is reciprocally displaced, based on a signal (cutting operation start signal) for starting a cutting operation by the cutting device 30, which is output from the placement controller 41, and a signal (cutting operation end signal) for ending the cutting operation.

More specifically, in the operation program for controlling the operation of the articulated robot 7 and the operation of each part of the placing head 6, placement lengths of the fiber bundles 2 that are placed during the single placement are included, in addition to the above-described basic speed. Note that, a path length (partial path length) of the fiber bundle 2 from the cutting position by the cutting device 30 (movable blade 32) to the pressing part 13*a* of the pressing device 13 on the path of the fiber bundle 2 is obtained in advance from the arrangement and configuration of the cutting device 30, a positional relationship between the cutting device 30 and the pressing device 13 (pressing part 13*a*), and the like. The partial path length corresponds to a length of an unplaced portion of the placement length during the above-described single placement at the time when the fiber bundle 2 is cut. In other words, a time point at which a remaining placement length becomes a length corresponding to the partial path length during the process of the placement becomes a time point at which the fiber bundle 2 is cut by the cutting device 30 (a time point at which the cutting operation is started). Therefore, the partial path length is also obtained in advance and is stored in advance in the storage unit 45.

The placement controller 41 also includes a timer circuit (not shown) configured to start an operation from a time point at which the placement is started (placement start time point) and to measure a time (placement time) during which the placement is executed. Note that, the placement controller 41 is configured to stop the time measurement by the timer circuit and to reset the timer circuit at a time point at which the single placement is over.

Further, at the placement start time point, the placement controller 41 is configured to obtain, for each placement, a time point (cutting operation start time point), at which the cutting operation by the cutting device 30 is started, from the placement length and the basic speed during the single placement and the above-described partial path length, by a time from the placement start time point. Further, the placement controller 41 is configured to output a cutting operation start signal to the cutting controller 46 at a time point at which the placement time measured by the timer circuit reaches the obtained cutting operation start time point.

When the cutting operation start signal is input, the cutting controller 46 controls the drive of each movable blade driving mechanism 31 so as to displace forward each movable blade 32 of the cutting device 30 from the standby position to the cutting position. The drive of each movable blade driving mechanism 31 is controlled by the cutting controller 46 in this way, and each movable blade 32 is moved forward to reach the cutting position from the standby position, so that the cutting of each fiber bundle 2 is performed.

Further, after cutting each fiber bundle 2, each movable blade 32 is moved backward from the cutting position to the standby position, so that the cutting operation by the cutting device 30 is ended. Therefore, after outputting the above-described cutting operation start signal, the placement controller 41 is configured to output, to the cutting controller 46, a cutting operation end signal for the cutting controller 46 to control the drive of each movable blade driving mechanism 31 so that such backward movement of each movable blade 32 is executed.

Note that, it is assumed that an output time point of the cutting operation end signal is set by an elapsed time starting from the output time point of the cutting operation start signal. However, the output time point of the cutting operation end signal is a time point at which the above-described backward movement of the movable blade 32 is started. Therefore, the elapsed time is a time (backward movement setting time) until the time point at which backward movement is started with respect to the output time point of the cutting operation start signal. The backward movement setting time is determined, in light of a time (forward movement time) necessary for each movable blade 32 to reach the cutting position from the standby position during the forward drive by each movable blade driving mechanism 31. Specifically, the backward movement setting time is determined as a time obtained by adding an appropriate margin time to the forward movement time so that the backward movement is started after each fiber bundle 2 is certainly cut. In addition, the backward movement setting time determined in this way is also stored in advance in the storage unit 45.

The placement controller 41 is configured to output the cutting operation end signal to the cutting controller 46 at a time point at which time has elapsed from the output time point of the cutting operation start signal (cutting operation start time point) by the backward movement setting time, based on the time measurement by the timer circuit.

When the cutting operation end signal is input, the cutting controller 46 controls the drive of each movable blade driving mechanism 31 so as to displace backward each movable blade 32 of the cutting device 30 from the cutting position toward the standby position. The drive of each movable blade driving mechanism 31 is controlled by the cutting controller 46 in this way, and each movable blade 32 is moved backward to reach the standby position from the cutting position, so that the cutting operation by the cutting device 30 is ended.

Note that, as for the cutting operation by the cutting device 30, the cutting operation is performed by displacing the movable blade 32 in a reciprocating manner between the standby position and the cutting position. However, since the standby position of the movable blade 32 is set to a position spaced from the path of the fiber bundle 2, strictly speaking, the cutting of the fiber bundle 2 by the movable blade 32 is performed during a partial period of a drive period, which is a period during which the movable blade 32 is driven in a reciprocating displacement manner. Specifically, the actual cutting of the fiber bundle 2 is started from a time point at which the blade edge of the movable blade 32 reaches a surface of the fiber bundle 2 (a time point at which the blade edge starts to come into contact with the fiber bundle 2) after the cutting operation start signal is output from the placement controller 46 to start the forward movement of the movable blade 32 as described above. Then, the cutting is completed at the time when the movable blade 32 (blade edge) reaches the cutting position. That is, the actual cutting period is a period from the time point at which the movable blade 32 reaches the existence range of the fiber bundle 2 in the thickness direction to the time point at which the movable blade reaches the cutting position.

Further, as the cutting operation end signal is output after the cutting is completed, the movable blade 32 is moved backward, and therefore, the cutting operation is ended.

However, in the backward movement process from the cutting position, a period until the movable blade 32 is separated from the fiber bundle 2, before reaching the standby position, is a period during which the movable blade 32 is within the existing range and is in a state where the movable blade 32 can come into contact with the fiber bundle 2. As such, a period from the time point at which the actual cutting is started during the forward movement to the time point at which the movable blade 32 is separated from the fiber bundle 2 during the backward movement is the period during which the movable blade 32 is within the existing range, and corresponds to the contact period referred to in the present invention.

In addition, as for the reciprocating displacement drive of the movable blade 32 by the cutting operation, in the cutting device 30 of the present embodiment, the movable blade 32 is driven so that the movable blade 32 is reciprocally displaced in a linear form in the thickness direction. That is, the movable blade 32 is driven in substantially the same position with respect to the feeding direction (in a state where there is no displacement). Therefore, even in the contact period included in the drive period during which the movable blade 32 is driven in the reciprocating displacement manner, the amount of displacement of the movable blade 32 in the feeding direction is zero.

Note that, as for the amount of displacement of the movable blade 32 in the feeding direction during the contact period, since the amount of displacement is zero as described above, the amount of displacement is naturally smaller than a feeding amount of the fiber bundle 2 in any period (for example, a period that is substantially the same as the contact period described above) during which the fiber bundle 2 is being fed from the delivery mechanism 20. As such, the cutting device 30 of the present embodiment is configured to drive the movable blade 32 in such an aspect that the amount of displacement of each movable blade 32 in the feeding direction during the contact period becomes smaller than the feeding amount of the fiber bundle 2 during a period corresponding to the contact period.

In the automated fiber bundle placement apparatus 1 configured as described above, first, the placing head 6 is moved to a position corresponding to the position where the placement is started on the placement die 5, and then, the movement of the placing head 6 is started in a state where the fiber bundle 2 is pressed onto the placement die 5 by the pressing part 13*a* of the placing head 6, so that the placement is started. In addition, at the placement start time point, the placement controller 41 configured to control the drive of the articulated robot 7 configured to move the placing head 6 outputs the basic speed signal, which indicates the basic speed that is the moving speed of the placing head 6, to the computing unit 44 of the drive control device 42.

When the basic speed signal is input, the computing unit 44 obtains a drive speed for driving the drive motor 22 at a speed at which the feeding speed of the fiber bundle 2 is the same as the basic speed, and outputs a drive command signal indicating the drive speed to the motor controller 43. The motor controller 43 starts control on the drive of the drive motor 22 configured to rotationally drive the conveying mechanism 21 (roller 21*a*) as the drive command signal is input. Thereby, as the movement of the placing head 6 is started as described above, the above-described tension control is executed, and the delivery of the fiber bundle 2 by the conveying mechanism 21 is started at the actual feeding speed corresponding to the basic speed as described above.

In addition, in the placement controller 41, the time measurement of the placement time by the timer circuit is started from the placement start time point. The placement controller 41 outputs the cutting operation start signal to the cutting controller 46 at a time point at which the placement time reaches the cutting operation start time point. Thereby, the control on the drive of each movable blade driving mechanism 31 by the cutting controller 46 is started, and the forward movement of each movable blade 32 of the cutting device 30 toward the cutting position is started. Then, each fiber bundle 2 is cut at a time point at which each movable blade 32 reaches the cutting position.

Further, the placement controller 41 outputs the cutting operation end signal to the cutting controller 46 at a time point at which the time has elapsed from the output time point of the cutting operation start signal by the backward movement setting time. Along with this, the cutting controller 46 controls the drive of each movable blade driving mechanism 31, so that the backward movement of each movable blade 32 toward the standby position is started. Then, the cutting operation is ended at a time point at which each movable blade 32 reaches the standby position. Thereafter, an end (cut end) of the cut fiber bundle 2 is moved toward the pressing part 13*a* as the placing head 6 is moved, and the cut end is pressed onto the placement die 5 by the pressing part 13*a*, so that the single placement is ended.

In the automatic fiber bundle placement apparatus 1 as described above, in a method of cutting the fiber bundle 2 by the cutting device 30 of the present invention, a time point determined as preceding a start time point (the cutting operation start time point) of the drive period during which the movable blade 32 is driven by a predetermined preceding period is set as a first time point. Then, a placement length of the fiber bundle 2 that is placed in an operating time of the movable blade 32 from the cutting operation start time point to an end time point of the contact period is obtained based on the operating time and the basic speed of the placing head 6, and then, an additional speed to extra deliver at least the placement length during the preceding period is obtained. Further, in the cutting method, the feeding speed of the fiber bundle 2 is changed from the actual feeding speed to the corrected feeding speed obtained by adding the additional speed to the actual feeding speed at the first time point, and the rotary drive of the roller 21*a* by the drive motor 22 is stopped at the cutting operation start time point.

That is, the automated fiber bundle placement apparatus 1 according to the present invention is configured so that the cutting of the fiber bundle 2 by the cutting device 30 is performed by the cutting method as described above. One embodiment (present embodiment) of the automated fiber bundle placement apparatus 1 is described in detail with reference to FIGS. 3 and 4.

Note that, the control on the drive motor 22 for changing the feeding speed of the fiber bundle 2 at the first time point as described above and stopping the rotation of the roller 21*a* at the cutting operation start time point is executed by the above-described drive control device 42. In addition, in the present embodiment, it is assumed that the first time point and the additional speed are stored in the above-described storage unit 45. That is, the storage unit 45 functions as the storage unit referred to in the present invention. However, it is assumed that in the storage unit 45, an arithmetic equation for obtaining the additional speed with the basic speed as a parameter is set in advance and the stored additional speed is obtained as a speed corresponding to the basic speed by using the arithmetic equation. Further, in the present embodiment, it is assumed that the calculation of the additional speed using the arithmetic equation is performed by the above-described computing unit 44. Further, it is assumed that the calculation for obtaining the corrected feeding speed from the obtained additional speed is also performed by the computing unit 44. That is, the computing unit 44 functions as the computing unit referred to in the present invention.

In the automatic fiber bundle placement apparatus 1, the first time point and the additional speed are stored in the storage unit 45 of the main control device 40, as described above. However, the additional speed is calculated using the arithmetic equation with the basic speed as a parameter, as described above. In addition, in the present embodiment, the first time point is calculated by using the cutting operation start time point and the predetermined preceding period. Therefore, the arithmetic equation and the preceding period are stored in advance in the storage unit 45.

As for the first time point, the first time point is a time point that goes back by the predetermined preceding period with respect to the cutting operation start time point, as described above. As described above, in the present embodiment, the cutting operation start time point is obtained for each placement by calculation, based on the basic speed during the placement. Therefore, the first time point is also obtained by calculation, as the cutting operation start time point is calculated.

Note that, the calculation of the first time point is performed by the placement controller 41. Therefore, the placement controller 41 is configured to perform the calculation of the first time point after the calculation of the cutting operation start time point, at each of the placement start time points at which the calculation of the cutting operation start time point is performed. In addition, the placement controller 41 is configured to output the calculated first time point to the storage unit 45, as the calculation is performed. Thereby, the first time point is stored in the storage unit 45, as described above.

Further, the calculation of the first time point by the placement controller 41 is performed using the previously calculated cutting operation start time point and the preceding period stored in the storage unit 45. Note that, as for the preceding period, the preceding period is determined based on a following concept.

First, in the above-described placement of the present embodiment, as described above, the control on the drive of the drive motor 22 for delivering the fiber bundle 2 is performed in a form of being accompanied by the tension control based on the tension of the fiber bundle 2. On the other hand, in the present invention, the feeding speed of the fiber bundle 2 is changed from the actual feeding speed corresponding to the basic speed of the placing head 6 to the corrected feeding speed (a speed faster than the actual feeding speed) obtained by adding the additional speed to the actual feeding speed, at the first time point, as described above. However, the movement of the placing head 6 is performed at the basic speed even after the first time point. For this reason, the above-described tension control needs to be ended at the time of reaching the first time point.

Therefore, if the preceding period is set to a long period, a period during which the tension control during the single placement is not executed is also lengthened. If the period during which the tension control is not executed becomes long, there is a concern that a problem may occur in the placement. On the other hand, if the preceding period is set to a short period, the corrected feeding speed should be increased as much as that. If the corrected feeding speed is increased, there are concerns that the fiber bundle 2 may be damaged or the load applied to the drive motor 22 may increase, depending on the speed. Therefore, the preceding period is set to a period having a length that does not cause such problems.

Further, as described above, the arithmetic equation for obtaining the additional speed is stored in advance in the storage unit 45. The calculation of the additional speed using the arithmetic equation stored in the storage unit 45 is performed by the computing unit 44. Therefore, the computing unit 44 is configured to calculate the additional speed by using the arithmetic equation stored in the storage unit 45, based on the basic speed indicated by the basic speed signal, at the placement start time point at which the basic speed signal indicating the basic speed is input from the placement controller 41, as described above. The computing unit 44 is configured to output the additional speed to the storage unit 45, as the additional speed is calculated. Thereby, the additional speed is stored in the storage unit 45.

Further, as for the arithmetic equation for calculating the additional speed, the arithmetic equation is an arithmetic equation with the basic speed as a parameter, as described above. More specifically, the arithmetic equation uses the operating time of the movable blade 32 from the cutting operation start time point to the end time point of the contact period, in addition to the basic speed, and is set to obtain the placement length of the fiber bundle 2 to be placed in the operating time, from the basic speed and the operating time. That is, the arithmetic equation is set to include multiplication of the operating time and the basic speed.

Note that, as for the operating time, the operating time is a time obtained by summing the above-described backward movement setting time (a time from the time point at which the forward movement of the movable blade 32 is started to the time point at which the backward movement is started) and a time from the time point at which the backward movement is started to a time point at which the movable blade 32 is separated from the fiber bundle 2. The backward movement setting time is a time stored in advance in the storage unit 45, as described above, and is a time perceived (obtained) in advance. In addition, the backward movement setting time is a time that can be obtained in advance from a time until the movable blade 32 is separated from the fiber bundle 2, a drive aspect (speed) of the movable blade 32, a thickness of the fiber bundle 2, and the like.

Further, the arithmetic equation is set so as to obtain the speed (the additional speed referred to in the present invention) for delivering the fiber bundle 2 corresponding to the placement length during the preceding period from the placement length obtained from the operating time and the basic speed and the preceding period. That is, the arithmetic equation is set so as to divide the multiplication result by the preceding period, in addition to the multiplication of the operating time and the basic speed.

However, the preceding period is also a period (time) stored in advance in the storage unit 45, as described above, and is a time perceived (obtained) in advance. Therefore, the variable (parameter) in the arithmetic equation is only the basic speed indicated by the basic speed signal that is output from the placement controller 41 for each placement, as described above.

Further, as described above, at the first time point, the feeding speed of the fiber bundle 2 is changed from the actual feeding speed to the corrected feeding speed obtained by adding the additional speed to the actual feeding speed. However, the corrected feeding speed that is changed at the first time point is calculated using the actual feeding speed at the first time point and the additional speed stored in the storage unit 45. Therefore, the calculation of the corrected feeding speed is performed at the first time point. Therefore, the computing unit 44 is configured to obtain the corrected feeding speed at the first time point by using the actual feeding speed at the first time point and the additional speed.

Note that, as described above, the placement controller 41 is configured to include the timer circuit configured to measure the placement time from the placement start time point. In addition, the placement controller 41 is configured to output a correction signal for causing execution of the calculation of the corrected feeding speed to the computing unit 44, at a time point at which the placement time reaches the first time point stored in the storage unit 45.

The computing unit 44 is configured to obtain a speed obtained by adding the additional speed stored in the storage unit 45 to the actual feeding speed at the first time point, i.e., the corrected feeding speed referred to in the present invention, as the correction signal is input. In addition, the computing unit 44 is configured to obtain a drive speed (corrected drive speed) of the drive motor 22 at which the feeding speed of the fiber bundle 2 by each conveying mechanism 21 becomes the corrected feeding speed, from the obtained corrected feeding speed, as the corrected feeding speed is obtained. Further, the computing unit 44 is configured to change the drive command signal, which is output to the motor controller 43, to one corresponding to the corrected drive speed at the time point at which the corrected drive speed is obtained in this way. The drive command signal output from the computing unit 44 is changed to one corresponding to the corrected drive speed in this way, so that the feeding speed of the fiber bundle 2 in each conveying mechanism 21 is changed from the actual feeding speed to the corrected feeding speed.

Note that, as described above, the placement until the first time point is performed with the tension control for correcting the drive speed based on the tension of the fiber bundle 2. However, after the first time point, i.e., after the time point at which the feeding speed of the fiber bundle 2 is changed to the corrected feeding speed, it is necessary to end the tension control. In addition, the tension control is executed by the drive control device 42. Therefore, in the present embodiment, the drive control device 42 is configured to end the tension control at the first time point.

Specifically, as described above, the tension control by the drive control device 42 is performed in such an aspect that the detected tension value of the fiber bundle 2 detected by the tension detector and the target tension value stored in the storage unit 45 are compared to obtain a deviation between both the values by the computing unit 44, and then, the computing unit 44 corrects the drive speed obtained based on the basic speed in a manner of eliminating the deviation, as described above. Therefore, it is assumed that the computing unit 44 is configured not to correct the drive speed, regardless of the presence or absence of the deviation, as the correction signal is input at the first time point. Thereby, after the first time point, it becomes a state where even when the detected tension value is different from the target tension value, the drive speed is not corrected, i.e., the tension control is over.

Further, as described above, in the present invention, the rotary drive of the roller 21*a* by the drive motor 22 is stopped at the cutting operation start time point. That is, the drive control device 42 configured to control the drive of the drive motor 22 is configured to execute drive of the drive motor 22 for stopping the rotary drive of the roller 21*a* at the cutting operation start time point. Note that, as described above, the placement controller 41 is configured to output the cutting operation start signal for starting the cutting operation to the cutting controller 46 at a time point at which the placement time measured by the timer circuit reaches the cutting operation start time point. In addition, the placement controller 41 is also configured to output the cutting operation start signal to the motor controller 43 of the drive control device 42. The motor controller 43 is configured to control the drive of the drive motor 22 described above, as the cutting operation start signal is input. Thereby, after the cutting operation start time point, it becomes a state where the rotary drive of the roller 21*a* by the drive motor 22 is stopped.

Note that, as for the cutting operation start time point obtained by the placement controller 41, in a period from the placement start time point to the cutting operation start time point at which the rotary drive of the roller 21*a* is stopped (the delivery of the fiber bundle 2 is stopped), for the period (preceding period) from the first time point to the cutting operation start time point, the fiber bundle 2 is delivered at the corrected feeding speed, as described above. Further, in the corrected feeding speed, the additional speed added to the actual feeding speed is a speed to extra deliver the fiber bundle 2, which corresponds to the placement length that is placed at the basic speed in the operating time of the movable blade 32, during the preceding period.

Thereby, at the cutting operation start time point, the fiber bundle 2 of a length that is delivered at the additional speed is in a state of being extra delivered, and as the delivery is stopped at the start of the cutting operation, as described above, a length of the fiber bundle 2 from the cutting position to the pressing part 13*a* coincides with the partial path length at the end time point of the operating time of the movable blade 32 (at the end time point of the contact period).

Therefore, a time point at which the fiber bundle 2 of a length obtained by subtracting the partial path length from the placement length for the single placement is completely placed coincides with the end time point of the contact period. Therefore, a time from the placement start time point to the end time point of the contact period can be obtained from the placement length and the partial path length during the single placement, and the basic speed. In addition, since the cutting operation start time point is the time point that goes back by the operating time of the movable blade 32 with respect to the end time point of the contact period, the cutting operation start time point is obtained as a time by subtracting the operating time from the obtained time until the end time point of the contact period.

According to the automated fiber bundle placement apparatus 1 as described above, during the single placement executed as described above, the placement controller 41 first obtains the cutting operation start time point by calculation, based on the basic speed during the placement, and obtains the first time point by using the obtained cutting operation start time point and the preceding period stored in the storage unit 45, at the placement start time point. Then, the placement controller 41 outputs the obtained first time point to the storage unit 45, so that the first time point is stored in the storage unit 45.

In addition, at the placement start time point, the basic speed signal indicative of the basic speed is input from the placement controller 41 to the computing unit 44, as described above. Then, as the basic speed signal is input, the computing unit 44 obtains the placement length of the fiber bundle 2, which is placed in the operating time, from the basic speed and the operating time of the movable blade 32 by using the arithmetic equation stored in the storage unit 45, and also obtains the additional speed for delivering the fiber bundle 2 of the placement length during the preceding period, from the obtained placement length and the preceding period. Further, the computing unit 44 outputs the obtained additional speed to the storage unit 45, so that the additional speed is stored in the storage unit 45.

In addition, although the placement is started, the placement controller 41 starts time measurement of the placement time by the timer circuit at the placement start time point, as described above. Then, in the process of the placement, when the placement time reaches the first time point stored in the storage unit 45, the placement controller 41 outputs the correction signal to the computing unit 44 at that time point. As the correction signal is input, the computing unit 44 obtains the corrected feeding speed obtained by adding the additional speed stored in the storage unit 45 to the actual feeding speed at that time point (the first time point), and also obtains the corrected drive speed, which is the drive speed of the drive motor 22 at which the feeding speed of the fiber bundle 2 becomes the obtained corrected feeding speed.

Then, by changing the drive command signal, which is output to the motor controller 43 by the computing unit 44, to one corresponding to the obtained corrected drive speed obtained, the feeding speed of the fiber bundle 2 by the conveying mechanism 21 is changed from the actual feeding speed to the corrected feeding speed at the first time point, and thereafter, the fiber bundle 2 is delivered at the corrected feeding speed. Note that, as described above, after the first time point, the tension control by the drive control device 42 is stopped.

After the first time point, the delivery of the fiber bundle 2 by the conveying mechanism 21 is performed at the corrected feeding speed, whereas the placement by the movement of the placing head 6 is performed at the basic speed. Thereby, as the placement progresses, slackening of the fiber bundle 2 gradually occurs in the fiber bundle 2 on a further downstream side than the conveying mechanism 21. Note that, the above-described regulation guide 12 is provided between the conveying mechanism 21 and the cutting device 30, on the further downstream side than the conveying mechanism 21. Therefore, the slackening of the fiber bundle 2 that occurs as described above occurs on a further downstream side than the regulation guide 12, particularly between the cutting device 30 and the pressing part 13*a* of the placing head 6.

Next, when the placement time reaches the cutting operation start time point stored in the storage unit 45, the placement controller 41 outputs the cutting operation start signal to the cutting controller 46 configured to control the drive of the cutting device 30 (the movable blade driving mechanism 31), and also outputs the cutting operation start signal to the motor controller 43 configured to control the drive of the drive motor 22 configured to rotationally drive the roller 21*a* of the conveying mechanism 21. This causes the cutting operation to be started by the cutting device 30 and the rotary drive of the roller 21*a* of the conveying mechanism 21 to be stopped. As a result, at the cutting operation start time point, the delivery of the fiber bundle 2 by the conveying mechanism 21 is stopped, and the cutting of the fiber bundle 2 by the cutting device 30 is performed in that state.

Note that, since the feeding speed of the fiber bundle 2 is changed to the corrected feeding speed at the first time point, as described above, the length of the fiber bundle 2 that is delivered during the preceding period until the time point at which the delivery of the fiber bundle 2 is stopped becomes a length obtained by adding a length (extra length) delivered at the additional speed during the preceding period to the length delivered at the actual feeding speed during the preceding period. Therefore, at the cutting operation start time point at which the delivery of the fiber bundle 2 by the conveying mechanism 21 is stopped, the fiber bundle 2 between the cutting device 30 on the further downstream side than the conveying mechanism 21 and the pressing part 13*a* of the placing head 6, i.e., the fiber bundle 2 on an upstream side of the pressing part 13*a* is in a state in which slackening of the extra length is generated. The extra length is the same length as the placement length of the fiber bundle 2 that is placed during a period from the time point at which the delivery of the fiber bundle 2 is stopped to the end time point of the contact period (a time point at which the fiber bundle 2 is completely cut and therefore the movable blade 32 is separated from the fiber bundle 2).

Although the placement is continued even after the cutting operation start time point at which the delivery of the fiber bundle 2 is stopped in this way, since the fiber bundle 2 is slackened on the upstream side of the pressing part 13*a*, as described above, the placement is performed while gradually eliminating the slack. Therefore, even when the delivery of the fiber bundle 2 by the conveying mechanism 21 is stopped, the supply of the fiber bundle 2 toward the pressing part 13*a* is continued by the slackened fiber bundle, so that the placement can be continued without stopping the same.

In addition, the delivery of the fiber bundle 2 is stopped as described above, so that the further upstream side than the slackened portion of the fiber bundle 2 is in a stopped state at a time point at which the movable blade 32 reaches the fiber bundle 2 during the cutting operation by the cutting device 30. Therefore, in the present embodiment, the cutting device 30 is configured so that the drive of the movable blade 32 is performed in the above-described aspect, but the cutting operation by the cutting device 30 can be still performed without causing jamming of the fiber bundle 2.

The placement is continued as described above, so that the slack of the fiber bundle 2 is gradually eliminated and the slack is completely eliminated at the end time point of the contact period. However, the time point is a time point after the time point at which the backward movement of the movable blade 32 is started. That is, the time point is a time point at which a part of the fiber bundle 2 to be placed is completely cut from the fiber bundle 2 connected to the stopped conveying mechanism 21. Therefore, the subsequent placement can also be continued without being affected by the stop of the conveying mechanism 21. Then, the cut end of the fiber bundle 2 is advanced to the position of the pressing part 13*a* and is placed onto the placement die 5 by the pressing part 13*a*, so that the single placement is over.

In the above, one embodiment (hereinafter, referred to as 'above embodiment') of the automated fiber bundle placement apparatus to which the present invention is applied has been described. However, the present invention is not limited to the above embodiment, and can also be implemented by other embodiments (modified embodiments) as described below.

(1) As for each setting information calculated based on the basic speed, in the above embodiment, as the setting information, the additional speed, the cutting operation start time point, and the first time point are obtained based on the basic speed by calculation. However, in the present invention, each of these setting information is not limited to being obtained for each placement, as in the above embodiment, and may be obtained in advance in a preparation step before an operation according to the operation program of the automatic fiber bundle placement apparatus 1 for the placement is started, and the setting information obtained in advance may be stored in the storage unit.

More specifically, each of the above-described setting information (the additional speed, the cutting operation start time point, and the first time point) is obtained using the basic speed, as described above, but the basic speed is included in the operation program and is already perceived in the preparation step. Therefore, each of the setting information can be obtained in the preparation step. Therefore, in the preparation step, the operator may obtain each of the setting information in advance by using the basic speed perceived as described above, and then, may cause each of the obtained setting information to be stored in the storage unit in a form of being included in the operation program. In this case, each of the setting information included in the operation program is used during each of the placements executed according to the operation program.

Alternatively, each of the setting information obtained in advance as described above may be input and set in a form of being associated with the basic speed by the input setting device and stored in the storage unit, and each of the setting information may be read out from the storage unit by referring to the basic speed included in the operation program at the time of each of the placements.

Further, as for the additional speed, the additional speed is for obtaining the corrected feeding speed, and in the above embodiment, is obtained at each of the above-described placement start time points after the operation of the automatic fiber bundle placement apparatus 1 is started (during the operation). However, even when the additional speed is obtained during the operation of the automatic fiber bundle placement apparatus 1, the time point at which the additional speed is obtained is not limited to the placement start time point, as in the above embodiment, and may be any time point before the corrected feeding speed is obtained. Therefore, in a case where the corrected feeding speed is obtained at the first time point, as in the above embodiment, the additional speed may be obtained before the first time point.

Further, as for the corrected feeding speed, in the above embodiment, the corrected feeding speed is also obtained during the operation of the automatic fiber bundle placement apparatus 1 (the first time point in each of the placements). However, in the present invention, the corrected feeding speed is not limited as being obtained as in the above embodiment.

More specifically, the corrected feeding speed is obtained using the actual feeding speed at the first time point, but in the above embodiment, the tension control is executed during the placement, and the actual feeding speed may be changed during the placement. Therefore, the calculation is performed at the first time point. However, in the present invention, it is not necessarily required that the tension control be executed during the placement, and the placement may be performed without the tension control. In this case, the feeding speed (actual feeding speed) of the fiber bundle 2 during the placement becomes a speed that coincides with the basic speed.

Therefore, in such a case, and in a case where the additional speed is obtained in advance in the preparation step, as described above, the corrected feeding speed may also be obtained in the preparation step and stored in advance in the storage unit, similar to the additional speed and the like. Further, even when the corrected feeding speed is obtained during the operation of the automatic fiber bundle placement apparatus 1, the corrected feeding speed may be obtained earlier than the first time point and after the time point at which the additional speed is obtained (for example, simultaneously with obtaining the additional speed), and stored in the storage unit.

(2) As for perceiving the time point (execution time point) at which each control device (the drive control device 42 and the cutting controller 46) is caused to execute each control, in the above embodiment, each execution time point is set by the time from the placement start time point. In addition, perceiving that the placement time reaches the time set for each execution time point is performed based on the time measurement by the timer circuit provided to the placement controller 41. However, in the present invention, perceiving each execution time point is not limited to the form described in the above embodiment.

Specifically, in a case where each execution time point is set by the time as described above and the perceiving is performed by comparison with the placement time, the placement time may be obtained by calculation, instead of being obtained using the timer circuit. Note that, as a method of obtaining the placement time by calculation, for example, an amount of rotation of the pressing part may be detected, the actual placement length may be obtained from the rotation amount, and the placement time may be obtained from the placement length and the basic speed.

In addition, instead of setting each execution time point by time, each execution time point may be set by the placement length of the fiber bundle 2. Specifically, as for the cutting operation start time point, the placement length at the end time point of the contact period is obtained from the placement length and the partial path length for the single placement. Further, based on the operating time of the movable blade 32 and the basic speed, the placement length of the fiber bundle 2 that is placed in the operating time (from the cutting operation start time point to the end time point of the contact period) can be obtained. Since the time point that goes back from the end time point of the contact period by the operating time is the cutting operation start time point, the placement length at the cutting operation start time point is obtained by subtracting the placement length that is placed in the operating time from the placement length at the end time point of the contact period. Therefore, the placement length may be obtained in this way, and the obtained placement length may be set as the cutting operation start time point.

Further, the placement length corresponding to the first time point is obtained by subtracting the placement length that is placed during the preceding period from the placement length set as the cutting operation start time point. Further, the placement length corresponding to the cutting operation end time point is obtained by adding the placement length that is placed in the backward movement setting time to the placement length set as the cutting operation start time point. Note that, the actual placement length during the placement may be obtained from the amount of rotation of the pressing part, for example, as described above.

(3) As for the cutting device, in the above embodiment, the cutting device 30 is configured to reciprocally displace the movable blade 32 in a linear form in the thickness direction of the fiber bundle 2. However, in the present invention, the cutting device is not limited to the configuration of the above embodiment as long as it is configured such that the drive of the movable blade is performed in such an aspect that the amount of displacement of the movable blade in the feeding direction during the contact period becomes smaller than the feeding amount of the fiber bundle 2.

More specifically, as the cutting device provided to the placing head (automatic fiber bundle placement apparatus), a cutting device configured such that the movable blade is displaced not only in the thickness direction but also in the feeding direction, such as a rotary cutter, for example, may be adopted. As such, even when the cutting device configured such that the movable blade is displaced in the feeding direction is adopted, if the cutting device is configured so that the movable blade is driven in such an aspect that the amount of displacement during the contact period becomes smaller than the feeding amount of the fiber bundle 2, the similar problems to the conventional device occur.

In addition, as the cutting device, a device such as a device using a score cutter or the like, which is configured such that a disk-shaped movable blade is displaced in the width direction of the fiber bundle 2 to perform cutting, may be adopted. In the case of such a cutting device, the cutting operation is performed while the movable blade is displaced in the feeding direction by displacing the movable blade so as to form an angle toward the downstream side with respect to the width direction. However, if the angle is small, relative positions of the movable blade and the fiber bundle 2 in the feeding direction change, so that the similar problems to the conventional device also occur.

Therefore, even when such a cutting device configured as described above is adopted, the occurrence of the problems can be effectively prevented by applying the present invention. That is, the automated fiber bundle placement apparatus to which the present invention is applied may be one in which such a cutting device is adopted for the placing head.

In addition, as for the cutting device, in the above embodiment, the cutting device 30 is provided for each path of the fiber bundle 2, and each cutting device 30 includes the receiving member 33 provided to sandwich the path between the receiving member and the movable blade 32. That is, the receiving member 33 is provided as a dedicated member for each cutting device 30. However, as for the receiving member of the cutting device in the present invention, the dedicated member provided for each cutting device is not limited to functioning as the receiving member, and a part of a member provided to extend over a plurality of cutting devices may function as a receiving member of each cutting device (a member functioning as a receiving member is also used for a plurality of cutting devices).

For example, in a case where a plurality of fiber bundles 2 is aligned in the width direction, a member extending over the existence range of the plurality of fiber bundles 2 may be provided to sandwich the fiber bundles 2 between the member and the movable blades of the respective cutting devices. In this case, a part of the member facing each movable blade corresponds to the receiving member of each cutting device.

(4) As for the path of the fiber bundle 2 in the placing head, in the above embodiment, the placing head 6 is configured to allot the paths of the sixteen fiber bundles 2 to the two positions different in the front and rear direction. That is, when placing a large number of the fiber bundles 2, the placing head 6 of the above embodiment is configured to allot the paths of the fiber bundles 2 in the placing head 6 to a plurality of paths in the front and rear direction in relation to the number of the fiber bundles 2, and the like. However, in the automated fiber bundle placement apparatus of the preamble of the present invention, the placing head is not limited to such a configuration, and may also be configured to have the paths of all the fiber bundles 2 at the same position in the front and rear direction.

Note that, in a case where the automated fiber bundle placement apparatus is configured to place a large number of the fiber bundles 2, as described above, the placing head is preferably configured to allot the paths to a plurality of paths in the front and rear direction so as to avoid enlargement of the placing head from, in relation to the number of the fiber bundles 2. However, if a size of the placing head is acceptable as a device in relation to the configuration of the device included in the placing head, and the like, the placing head may be configured so that the paths are at the same position in the front and rear direction, even when the number of the fiber bundles 2 to be placed is large as in the above embodiment.

In addition, in the automated fiber bundle placement apparatus of the preamble of the present invention, the number of the fiber bundles 2 to be placed is not particularly limited. Therefore, even when the paths are set to the same position, the placing head is not enlarged, as compared to the above embodiment, depending on the number of the fiber bundles 2 (when the number of the fiber bundles is small). However, even when the number of the fiber bundles 2 to be placed is small, the placing head may be configured so that the paths are allotted to a plurality of positions in the front and rear direction. As such, the configuration for the path in the placing head may be determined as appropriate, considering the number of the fiber bundles 2, the size of the placing head, and the like.

The present invention is not limited to the above embodiment, and can be variously changed without departing from the gist of the present invention.

The invention claimed is:

1. An automated fiber bundle placement apparatus comprising a placing head configured to perform placement of a plurality of fiber bundles supplied from a supply device onto a placement die by pressing the fiber bundles onto the placement die by a pressing part, the placing head comprising a delivery mechanism having a pair of rollers provided for each of paths of the fiber bundles so as to deliver the fiber bundle toward the pressing part and a drive motor configured to rotationally drive at least one of the pair of rollers; an articulated robot configured to move the placing head at a preset basic speed for the placement; and a drive control device configured to control drive of the drive motor so that a feeding speed of the fiber bundle becomes an actual feeding speed corresponding to the basic speed, wherein the placing head has a cutting device provided between the pressing part and the delivery mechanism in a feeding direction of the fiber bundle and configured to cut the fiber bundle to be a placement length corresponding to the single placement by driving a movable blade, the cutting device is configured such that the cutting is performed during a contact period for which the movable blade and the fiber bundle come into contact with each other during a drive period for which the movable blade is driven, and is configured such that drive of the movable blade is performed in such an aspect that an amount of displacement of the movable blade in the feeding direction during the contact period becomes smaller than a feeding amount of the fiber bundle, and the single placement is performed by moving the placing head at the basic speed from a start time point to an end time point of the single placement, while the pressing of the fiber bundle onto the placement die by the pressing part is maintained, and a cut end of the cut fiber bundle is pressed onto the placement die by the pressing part, so that the single placement of the fiber bundle is ended, wherein the automated fiber bundle placement apparatus includes a storage unit configured to store a first time point and an additional speed, wherein the first time point is a time point between the start time point of the placement during the single placement and a start time point of the drive period during the same single placement, the first time point is determined as the time point that precedes the start time point of the drive period by a predetermined preceding period, wherein the additional speed is a speed used to deliver the fiber bundle of a length equal to or longer than the placement length of the fiber bundle in an operating time of the movable blade, during the preceding period, wherein the operating time of the movable blade is determined as a time from the start time point of the drive period to an end time point of the contact period, the placement length of the fiber bundle in the operating time of the movable blade is determined from the operating time of the movable blade and the basic speed, wherein the drive control device is configured to control drive of the drive motor so that the feeding speed is the actual feeding speed from the start time point of the placement during the single placement to the first time point during the single placement and change the feeding speed from the actual feeding speed that is a speed corresponding to the basic speed, to a corrected feeding speed that is a speed obtained by adding the additional speed to the actual feeding speed at a time point reaching the first time point during the single placement, and to stop rotary drive of the roller by the drive motor at the start time point of the drive period.

2. The automated fiber bundle placement apparatus according to claim 1, wherein an arithmetic equation for obtaining the additional speed with the basic speed as a parameter is set in advance in the storage unit, and wherein the automated fiber bundle placement apparatus includes a computing unit configured to obtain the additional speed corresponding to the basic speed by using the arithmetic equation, and to obtain the corrected feeding speed based on the obtained additional speed.

* * * * *